United States Patent [19]

Kim

[11] Patent Number: 5,216,216
[45] Date of Patent: Jun. 1, 1993

[54] EQUIPMENT FOR DISCHARGING OVERFLOWS IN A MICROWAVE OVEN

[75] Inventor: Yung H. Kim, Kyungki, Rep. of Korea

[73] Assignee: Samsung Electronics Co., Ltd., Suweon, Rep. of Korea

[21] Appl. No.: 724,218

[22] Filed: Jul. 1, 1991

[30] Foreign Application Priority Data

Jun. 30, 1990 [KR] Rep. of Korea ............... 90-9495[U]

[51] Int. Cl.⁵ .............................................. H05B 6/80
[52] U.S. Cl. ...................... 219/10.55 E; 99/DIG. 14
[58] Field of Search ............... 219/10.55 R, 10.55 E, 219/10.55 D; 99/451, DIG. 14

[56] References Cited

U.S. PATENT DOCUMENTS

| | | | |
|---|---|---|---|
| 3,505,490 | 4/1970 | Gorn | 219/10.55 R |
| 3,701,872 | 10/1972 | Levinson | 219/10.55 R |
| 3,753,651 | 8/1973 | Boucher | 219/10.55 R |
| 3,845,270 | 10/1974 | Widugris, Jr. | 219/10.55 R |

FOREIGN PATENT DOCUMENTS 53-44339  4/1978  Japan .

*Primary Examiner*—Philip H. Leung
*Attorney, Agent, or Firm*—Burns, Doane, Swecker & Mathis

[57] ABSTRACT

A microwave oven includes a bottom having a groove arrangement in which food overflows ar collected. The groove has discharge openings less than 1 cm in diameter through which the collected overflows can drain. A removable tray is mounted on the exterior of the oven beneath the discharge openings to receive the draining overflows.

4 Claims, 4 Drawing Sheets

EQUIPMENT FOR DISCHARGING OVERFLOWS IN A MICROWAVE OVEN

BACKGROUND OF THE INVENTION

1. Field of the Invention

This invention relates to a device for discharging overflows and water which are flooded over from a cooking ware in a cooking compartment of a microwave oven during cooking.

2. Description of the Related Art

In cooking a food to be boiled such as rice and a pot stew with a microwave oven, the cooking materials and water may be generally boiled over and fallen down to be scorched or burnt on the flat bottom of the cooking compartment by cooking heat.

A ventilation system for exhausting water vapor generated in the cooking compartment has been known from Japanese utility Laid-Open Publication No. 53-44339, which discloses a microwave oven including a cabinet having a ceiling, which is provided with openings matched with exhaust openings in an oven ceiling, an exhaust opening plate formed with openings for preventing electric wave leakage and inserted in the oven ceiling, and a door formed with openable and shutable openings and having an upper end close to the openings in the cabinet ceiling and a lower end mounted on the oven ceiling. The microwave oven can, however, exhaust water vapor generated in the cooking compartment outwards, but can not discharge the cooking materials and water overflowed on the bottom of the cooking compartment.

In the existing microwave ovens, the overflows fallen on the bottom are left as they are to be scorched thereon by heating in the cooking compartment, requiring hard scrubbing to be removed. Moreover, in electrostatic focusing areas, the overflows may be burnt to generate sparking carbon particles leading to the shortened life and deteriorated reliability of the system.

SUMMARY OF THE INVENTION

Accordingly, an object of this invention is to provide a derice enabling overflows in a microwave oven to be drained out along bottom sides of a cooking compartment.

The object is attained according to the invention by a device for discharging overflows, comprising:

a bottom of a cooking compartment declined from the middle to the sides except for the region of a tray;

guide grooves formed along the bottom sides respectively, at least one of them being deeper than the others to receive fluid materials from the others;

at least a discharge opening formed downwards in the deeper guide groove and leading to the outside of the compartment;

a receiving vessel provided under the compartment and covering the discharge opening to receive the fluid materials therethrough; and a supporting means consisting of a set of guiding flanges formed under the compartment and supporting a slidable receiving vessel.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 1:
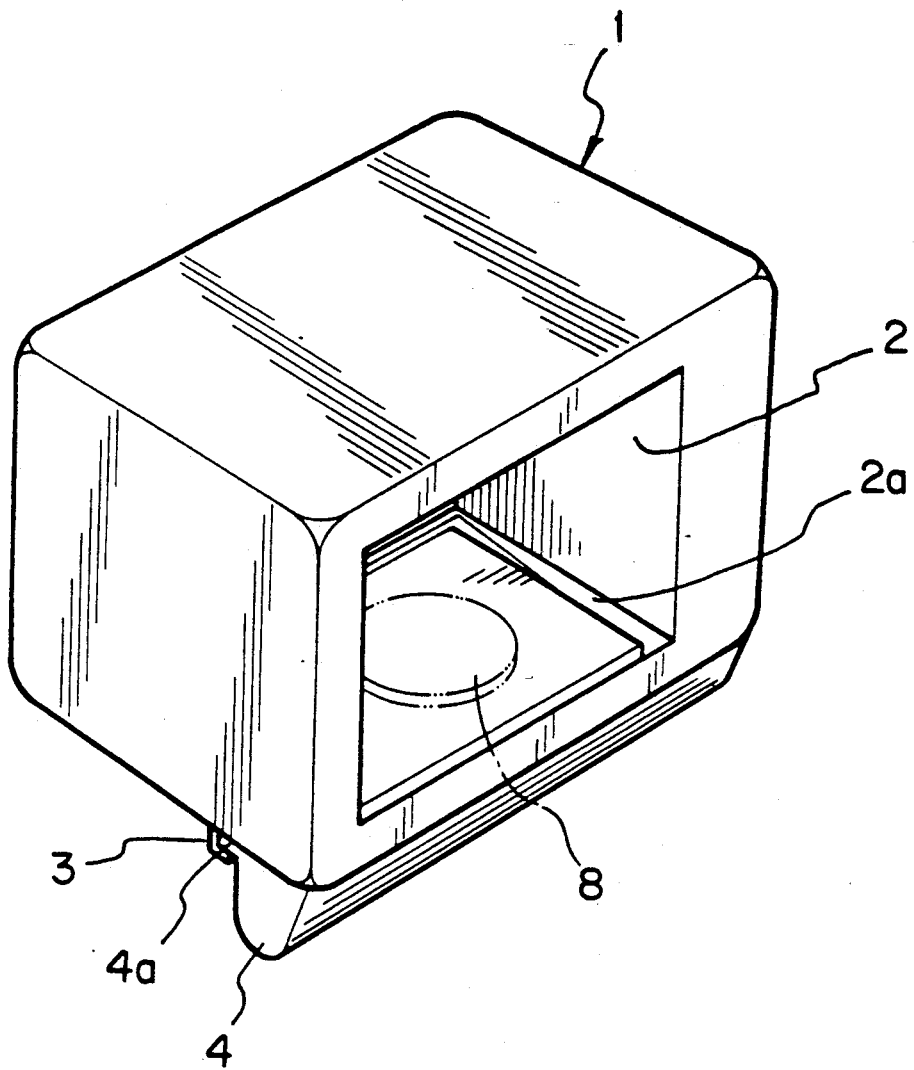
FIG. 1 is a perspective view showing a microwave oven according to the invention.

As can be seen in FIG. 1, showing a microwave oven 1 according to the invention in a perspective view, a cooking compartment 2, whose door is removed to provide easy observation, has a bottom declined from the middle to the sides except for the region of a tray 8. The four sides of the bottom are formed with guide grooves 2a, and the front side has also a plurality of discharge openings 2b formed therein. The guide grooves 2a in the right and left sides are declined from the rear side toward the front side to make it easy for overflows flooded over during cooking to find their way to the front side. Thereby, the overflows run down along the guide grooves 2a and are led to the front guide groove 2a.

The discharge openings 2b provided in the front guide groove 2a, which is the lowest one of the guide grooves 2a, discharge the overflows accumulated in the front guide groove 2a to outside of the microwave oven 1, and have, preferably, a diameter less than 1 cm to prevent high frequency radio waves from leakage.

Figure 2:
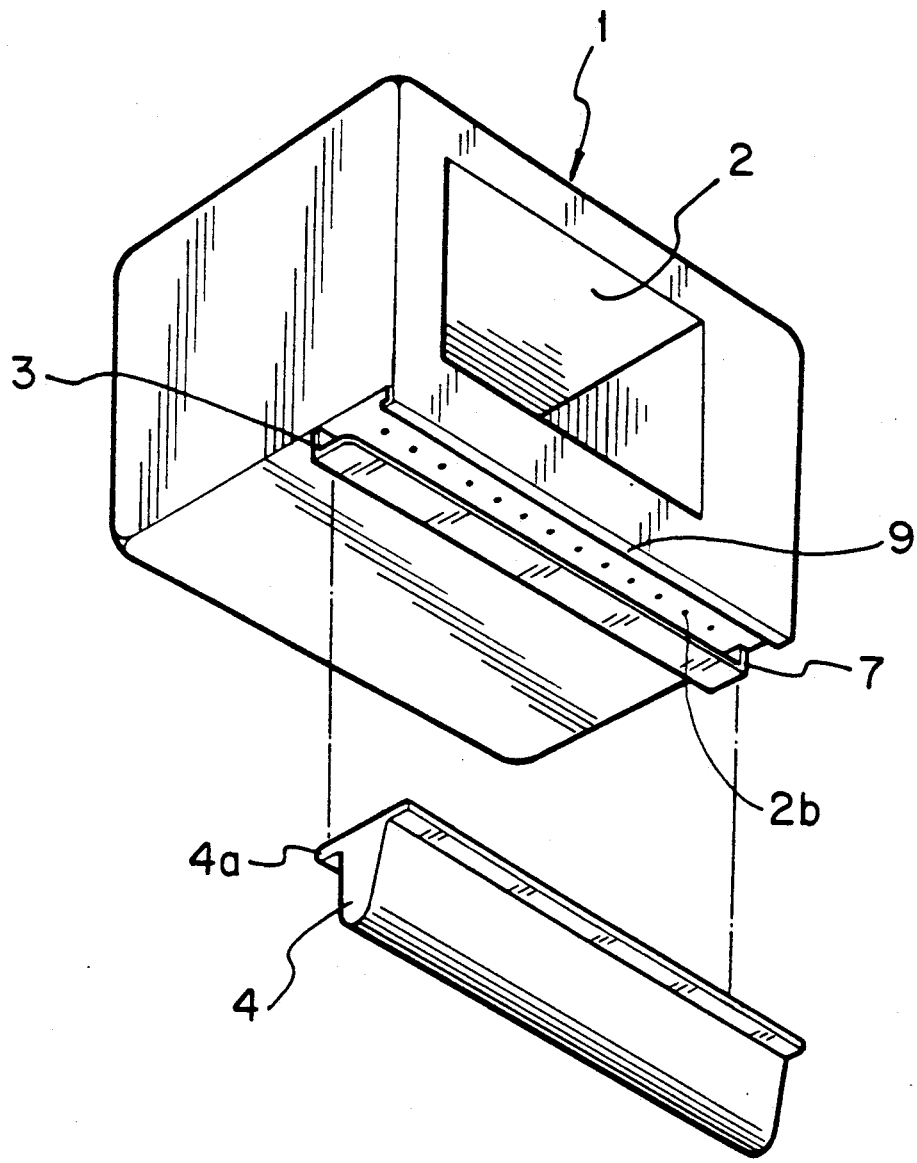
FIG. 2 is an exploded perspective view showing the mounting of a receiving vessel on the microwave oven according to the invention.

To receive the overflow discharged through the discharge openings 2b, as shown in FIG. 2, a receiving vessel 4 is provided under the front end region of the microwave oven 1. The receiving vessel 4 is made from a material which can isolate penetration of high-frequency waves, and has an opened top side having a length and width enough to cover all of the discharge openings 2b in the front guide groove 2a.

The mounting of the receiving vessel 4 on the microwave oven 1 is attained by a web 4a extended rearwards from the top side of the receiving vessel 4 along the longitudinal direction thereof, and a guide flange 3 having a cross section of "L" shape is correspondingly provided under the microwave oven 1 to be engaged with the web 4a. When mounting the receiving vessel 4 on the microwave oven 1, the receiving vessel 4 is inserted into the guide flange 3 with its web 4a from the right or left side of the microwave oven 1. To this end, the right or left end of the guide flange 3 is opened to allow the insertion of the receiving vessel 4 and the other end is closed to form a stopper wall 7 for defining the insertion position. In addition, under the front end region of the microwave oven 1, a supporting flange 9 is provided being analog! with but opposite to the guide flange 3 to prevent the receiving vessel 4 from escaping from the guide flange 3.

The depth of the receiving vessel 4 shall be naturally lower than that of legs of the microwave oven 1, so that it can be easily mounted on or dismounted from the microwave oven 1 left on a table.

Figure 3:
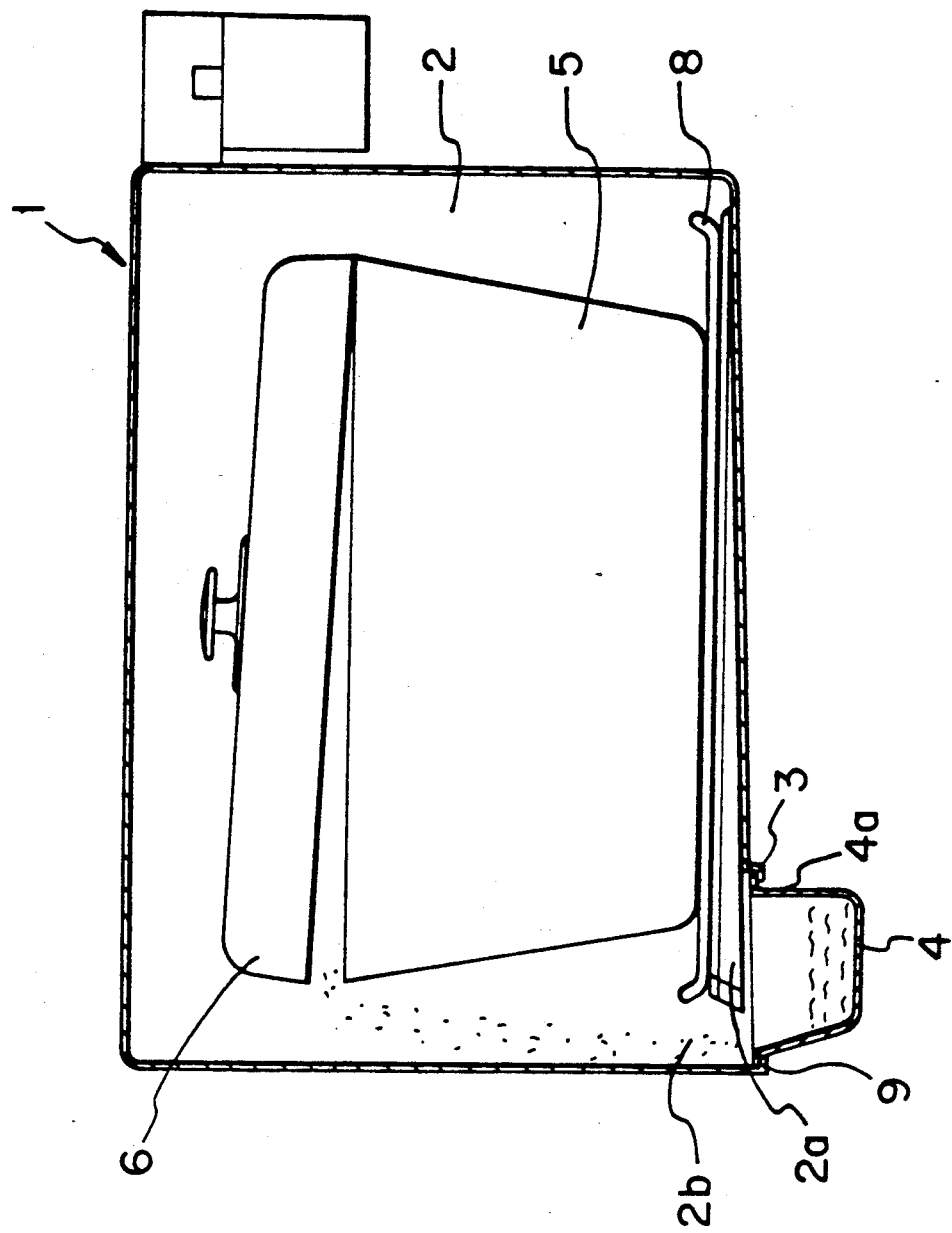
FIG. 3 is a schematic sectional view illustrating the construction and function of the invention.
Figure 4:
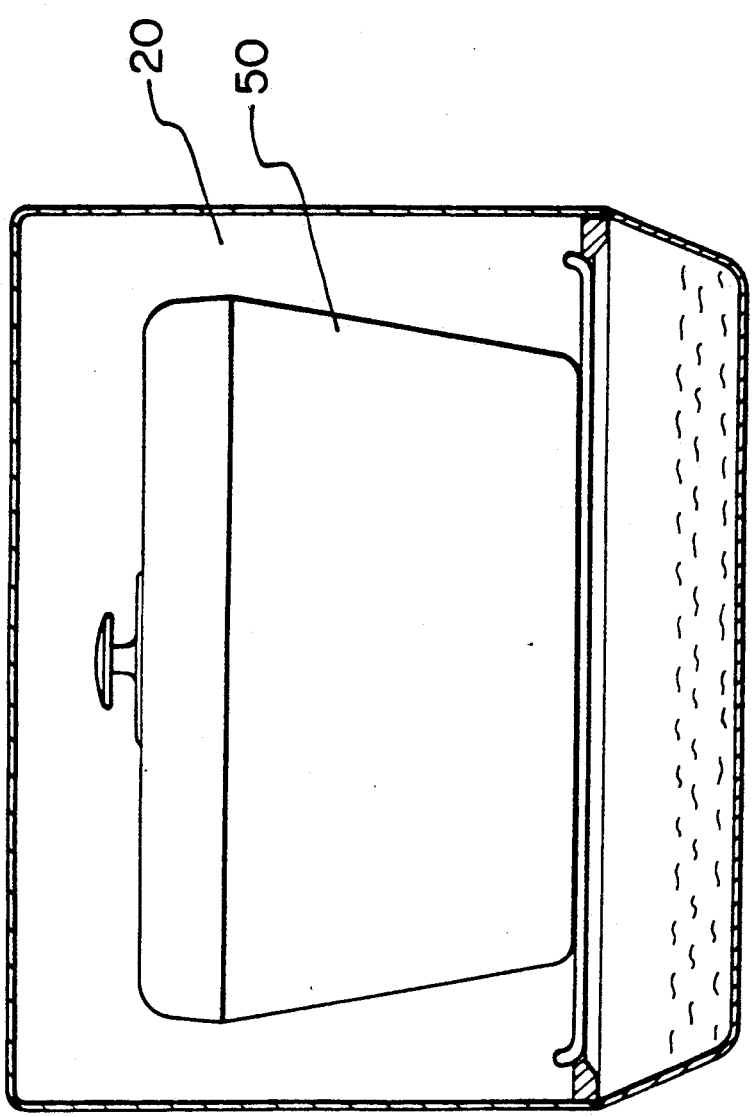
FIG. 4 is a schematic front view of FIG. 3.

The derice according to the invention for discharging overflows in cooking compartment 2, having the construction as described above, functions as follows:

A cooking were containing water and materials for a food to be boiled such as rice or pot stews is put on the tray 8 in the cooking compartment 2 to be heated by turning-on the microwave oven. With the lapse of time, the heated water and cooking materials come to the point of boiling over to overflow on to the base of the cooking compartment 2, as shown in FIG. 3.

The fallen overflow of the water and cooking material run down the declined base to the four guide grooves 2a and then along the also both declined side guide grooves 2a to accumulate in the front guide groove 2a. The overflow reached in the front guide groove 2a are discharged through the discharge openings 2b to be received by the receiving vessel 4 provided under the space of the front guide groove 2a.

The receiving vessel 4 slidably mounted in the guide flange 3 by its web 4a can be easily dismantled therefrom, so that the user can do away with the accunulated overflow therein on demands and then slide it into the guide flange 3 to remount it. The supporting flange 9 formed opposite to the guide flange 3 prevents the inserted receiving vessel 4 from moving forward.

In another embodiment of the invention, it is of course possible that the discharge openings are provided in all of the four guide grooves 2a or in one or more of them, not restricted to the front guide groove 2a as in the above-described embodiment. At this time, the receiving vessel(s) 4 is(are) correspondingly disposed under the microwave oven 1.

The receiving vessel 4 may also have different constructions from the illustrated embodiment, for example a front drawing out and pushing back mechanism in the mounting, an application of discharging tubes extended from the discharge openings 2b to an exterior receiving vessel.

As stated above, the equipment according to the invention enables overflow, flooded over from the cooking ware in cooking to be run down along the bottom sides of the cooking compartment 2 to the receiving vessel 4 under the microwave oven 1, so that the cooking compartment 2 keeps clean and the overflow can no longer be scorched or burnt.

What is claimed is:

1. A microwave oven comprising:
   a housing forming an internal cooking chamber having a floor upon which food is to be cooked,
   said floor being sloped down toward its outer peripheral border, so that food spillage tends to travel to said border,
   a groove arrangement extending completely around said border for receiving spillage from said border, said groove arrangement including a first portion and a remaining portion, said remaining portion being inclined to cause spillage to gravitate to said first portion,
   said first portion having discharge openings in a bottom thereof for discharging spillage out of said cooking chamber, and
   a receiving vessel removably mounted to said housing beneath said discharge openings for receiving spillage therefrom.

2. A microwave oven according to claim 1, wherein said openings have a diameter less than one centimeter.

3. A microwave oven according to claim 2, wherein said housing includes a door at a front side thereof, said first portion of said groove arrangement extending along a front portion of said border adjacent said door.

4. A microwave oven according to claim 3, wherein said housing includes flanges situated on an underside of said housing, said vessel including a web along its upper side, said web being slidable on said flanges.

* * * * *